(No Model.)

R. P. FRIST.
MANUFACTURE OF PARCHMENTIZED FIBER TUBES.

No. 485,408. Patented Nov. 1, 1892.

Witnesses:
R. Schleicher.
Alex Barkoff

Inventor:
Robert Porter Frist
by his Attorneys
Howson & Howson

UNITED STATES PATENT OFFICE.

ROBERT PORTER FRIST, OF WILMINGTON, DELAWARE, ASSIGNOR, BY MESNE ASSIGNMENTS, TO THE DELAWARE HARD FIBRE COMPANY, OF SAME PLACE.

MANUFACTURE OF PARCHMENTIZED-FIBER TUBES.

SPECIFICATION forming part of Letters Patent No. 485,408, dated November 1, 1892.

Application filed May 5, 1890. Serial No. 350,551. (No model.) Patented in England January 19, 1892, No. 1,084.

*To all whom it may concern:*

Be it known that I, ROBERT PORTER FRIST, a citizen of the United States, residing at Wilmington, in the county of New Castle and State of Delaware, have invented certain new and useful Improvements in the Manufacture of Parchmentized-Fiber Tubes, (for which I have received Letters Patent in Great Britain, No. 1,084, dated January 19, 1892,) of which the following is a specification.

Prior to my invention, so far as my knowledge extends, the only known mode of making tubes of parchmentized fiber consisted in winding a sheet of fiber, the width of which was equal to the length of the tube desired, upon a rod or mandrel in successive layers, caused to adhere together by pressure-rolls. This method was capable of producing good results only when producing short tubes of comparatively-large diameter, as the length of the tube was necessarily limited by the width of the sheet, and the strain upon the mandrel was so great as to cause it to spring or yield laterally when making small tubes, neither the roll nor the mandrel being able to resist the lateral pull of the fabric.

My invention has for its object the manufacture of tubes of parchmentized fiber of almost any desired diameter and length, which end I attain by winding strips of the fiber, moistened with the transforming agent, spirally one upon the other and subjecting them to pressure during this operation, whereby the abutting edges of each strip and the adjacent surfaces of this superimposed layers are caused to adhere and form a comparatively-rigid tube with close joints.

The subject-matter claimed is hereinafter specified.

The accompanying drawings indicate so much only of apparatus which may be used in carrying out my invention as is necessary to illustrate the subject-matter claimed.

Figure 1:
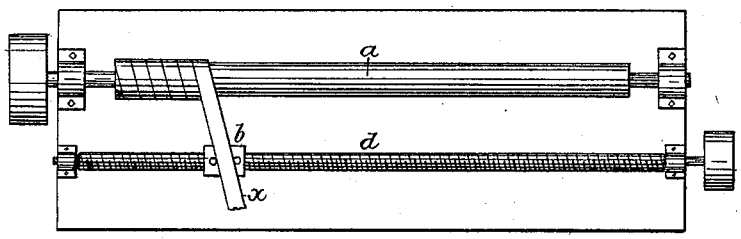
Figure 2:
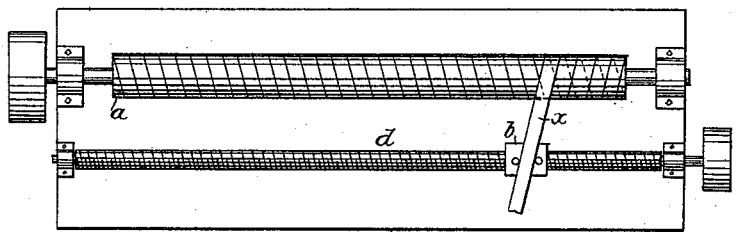
Figure 3:
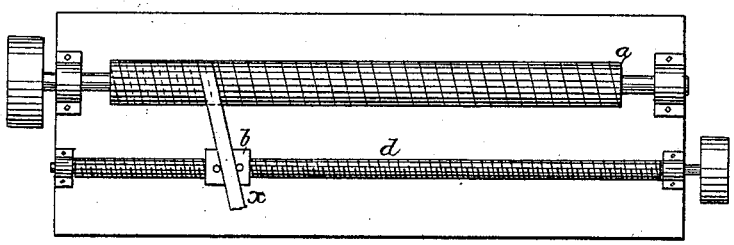

Figures 1, 2, and 3 are respectively diagrammatic plans illustrating my improved method of manufacturing parchmentized-fiber tubes, Fig. 1 showing the commencement of the operation of winding a suitably-prepared moist strip upon a mandrel, Fig. 2 illustrating my method of winding a second such strip upon the first in the reverse direction or with its spirals crossing, and Fig. 3 a similar view with the superposed strip wound upon and parallel with the under one with its joints overlapping.

The drawings show a mandrel $a$ supported and operated in usual ways. A traversing carriage $b$, provided with guides for the strip $x$, is mounted on a screw-shaft $d$, parallel with the mandrel and rotated by suitable means. This rotation causes the carriage to traverse the mandrel and lay the strip of chemically-treated fiber as it passes from the treating-bath on the mandrel in spiral form, the relative feed of the carriage and mandrel being such that the edges of the strip will abut closely against each other without overlapping. When the carriage reaches the end of its traverse, its movement may be reversed to wind another layer upon the first one in the reverse direction or with its spirals crossing, as shown in Fig. 2. Instead of doing this, however, the carriage may be run back to the starting-point and the succeeding strip wound upon the first with its spirals parallel thereto, but with the joints overlapping, so as to break joints, as shown in Fig. 3. As the strips are wound on the mandrel or upon each other they are subjected to pressure, which has the effect of cementing their surfaces together. The abutting edges of the spiral convolutions of each strip are likewise cemented by reason of their contact and the character of the material, thus forming a continuous tube.

The strips of paper or other fibrous material of which the tubes are to be made are preferably thin in order to secure the effective action of the chemical transforming-bath. When thick tubes are desired, several strips may successively be wound one upon the other until the desired thickness is obtained.

I am aware that tubes have heretofore been made of spirally-wound fibrous material, such as cotton cloth saturated with caoutchouc; but such treatment differs from mine not only in the material used, but in the result produced, the abutting edges in the case mentioned being merely caused to adhere by the cement, while by my improved process the chemical composition of the fabric is changed and a continuous fabric produced by the amalgamation or consolidation of the surfaces in contact.

The strip of paper in a soft and pasty condition as it comes from the chemical bath is wound spirally about the mandrel, and the result is a tube or conduit of homogeneous parchmentized fiber or paper having a spiral structure.

I claim as new and of my own invention—

1. The hereinbefore-described method of making tubes or conduits, which consists in subjecting a strip of paper or fiber to a chemical bath and while it is in a soft and pasty condition winding it spirally upon a mandrel.

2. The hereinbefore-described method of making tubes of parchmentized fiber, which consists in winding moistened strips of the treated fiber in spiral form, so that its edges shall closely abut, and cementing said edges by pressure, as set forth.

3. The hereinbefore-described method of making tubes of parchmentized fiber, which consists in winding moistened strips of the treated fiber in spiral form one upon the other with their edges closely abutting and cementing and consolidating the edges and the surfaces of the strips together by pressure, as set forth.

4. The hereinbefore-described method of making tubes of parchmentized fiber, which consists in winding moistened strips of the treated fiber in spiral form one upon the other with closely-abutting edges, those of one strip being parallel with but overlapping or breaking joints with the others, and cementing and consolidating the abutting edges and surfaces by pressure, as set forth.

5. As a new article of manufacture, parchmentized-fiber tubes composed of spirally-wound strips with their abutting edges consolidated and cemented together, so as to form a continuous fabric, as set forth.

6. As a new article of manufacture, parchmentized-fiber tubes composed of superimposed spirally-wound strips with their abutting edges and surfaces consolidated and cemented together so as to form a continuous fabric, as set forth.

7. A tube or conduit composed of homogeneous parchmentized fiber or paper having a spiral structure.

In testimony whereof I have signed my name to this specification in the presence of two subscribing witnesses.

ROBERT PORTER FRIST.

Witnesses:
HERMANN E. FRIST,
THOMAS REARDON.